United States Patent
Alpaslan et al.

(10) Patent No.: US 10,297,071 B2
(45) Date of Patent: May 21, 2019

(54) 3D LIGHT FIELD DISPLAYS AND METHODS WITH IMPROVED VIEWING ANGLE, DEPTH AND RESOLUTION

(71) Applicant: Ostendo Technologies, Inc., Carlsbad, CA (US)

(72) Inventors: Zahir Y. Alpaslan, San Marcos, CA (US); Hussein S. El-Ghoroury, Carlsbad, CA (US)

(73) Assignee: Ostendo Technologies, Inc., Carlsbad, CA (US)

( * ) Notice: Subject to any disclaimer, the term of this patent is extended or adjusted under 35 U.S.C. 154(b) by 76 days.

(21) Appl. No.: 14/452,329

(22) Filed: Aug. 5, 2014

(65) Prior Publication Data

US 2014/0347361 A1    Nov. 27, 2014

Related U.S. Application Data

(63) Continuation of application No. PCT/US2014/029623, filed on Mar. 14, 2014.

(Continued)

(51) Int. Cl.
*G06T 15/50* (2011.01)
*H04N 13/307* (2018.01)

(52) U.S. Cl.
CPC .......... *G06T 15/50* (2013.01); *H04N 13/307* (2018.05)

(58) Field of Classification Search
CPC .......... G02B 27/2214; G02B 27/0172; G02B 27/0093; G02B 2027/0138; G02B 2027/014; G02B 2027/0178; G02B 2027/0187; G02B 27/017; G02B 2027/0118; G02B 27/1066; G02B 27/225; G02B 26/0833; G02B 26/101; G02B 26/08; G02B 26/085; G02B 26/0875; G02B 26/10; G02B 27/22; G02B 27/2271; G02B 2027/0127; H04N 13/0497;

(Continued)

(56) References Cited

U.S. PATENT DOCUMENTS 5,059,008 A   10/1991   Flood et al.
5,691,836 A   11/1997   Clark (Continued)

FOREIGN PATENT DOCUMENTS

CN    102007771    4/2011
JP    9-54281    2/1997

(Continued)

OTHER PUBLICATIONS

"International Search Report and Written Opinion of the International Searching Authority Dated Jul. 24, 2014; International Application No. PCT/US2014/029623", (dated Jul. 24, 2014).

(Continued)

*Primary Examiner* — Dave Czekaj
*Assistant Examiner* — Kehinde Abimbola
(74) *Attorney, Agent, or Firm* — Womble Bond Dickinson (US) LLP

(57) ABSTRACT

3D light field display methods and apparatus with improved viewing angle, depth and resolution are introduced. The methods can be used to create a high quality 3D light field display of any size from smaller than a postage stamp to larger than a three story building.

31 Claims, 7 Drawing Sheets

Top View

Side View

Related U.S. Application Data

(60) Provisional application No. 61/800,818, filed on Mar. 15, 2013.

(58) Field of Classification Search
CPC ........... H04N 13/0468; H04N 13/0404; A61K 2300/00; A61K 6/083; A61K 31/198; A61K 31/353; A61K 31/485; A61K 31/7056; A61K 31/7072; A61K 31/737; A61K 6/0052; A61K 45/06; A61K 9/1652; A61K 31/185; A61K 31/4439; A61K 31/575
See application file for complete search history.

(56) References Cited

U.S. PATENT DOCUMENTS

| | | | |
|---|---|---|---|
| 5,986,811 A | 11/1999 | Wohlstadter | |
| 6,151,167 A | 11/2000 | Melville | |
| 6,433,907 B1 | 8/2002 | Lippert et al. | |
| 6,795,221 B1 | 9/2004 | Urey | |
| 6,795,241 B1 | 9/2004 | Holzbach | |
| 6,803,561 B2 | 10/2004 | Dunfield | |
| 6,924,476 B2 | 8/2005 | Wine et al. | |
| 6,937,221 B2 | 8/2005 | Lippert et al. | |
| 6,999,238 B2 | 2/2006 | Glebov et al. | |
| 7,061,450 B2 | 6/2006 | Bright et al. | |
| 7,071,594 B1 | 7/2006 | Yan et al. | |
| 7,106,519 B2 | 9/2006 | Aizenberg et al. | |
| 7,190,329 B2 | 3/2007 | Lewis et al. | |
| 7,193,758 B2 | 3/2007 | Wiklof et al. | |
| 7,209,271 B2 | 4/2007 | Lewis et al. | |
| 7,215,475 B2 | 5/2007 | Woodgate et al. | |
| 7,232,071 B2 | 6/2007 | Lewis et al. | |
| 7,334,901 B2 | 2/2008 | El-Ghoroury | |
| 7,369,321 B1 | 5/2008 | Ren et al. | |
| 7,400,439 B2 | 7/2008 | Holman | |
| 7,482,730 B2 | 1/2009 | Davis et al. | |
| 7,486,255 B2 | 2/2009 | Brown et al. | |
| 7,551,280 B2* | 6/2009 | Yanai | G02B 27/1046 349/5 |
| 7,580,007 B2 | 8/2009 | Brown et al. | |
| 7,619,807 B2 | 11/2009 | Baek et al. | |
| 7,623,560 B2 | 11/2009 | El-Ghoroury et al. | |
| 7,630,118 B2 | 12/2009 | Onvlee | |
| 7,724,210 B2 | 5/2010 | Sprague | |
| 7,767,479 B2 | 8/2010 | El-Ghoroury et al. | |
| 7,791,810 B2 | 9/2010 | Powell | |
| 7,829,902 B2 | 11/2010 | El-Ghoroury et al. | |
| 7,835,079 B2 | 11/2010 | El-Ghoroury et al. | |
| 7,841,726 B2 | 11/2010 | Conner | |
| 7,952,809 B2 | 5/2011 | Takai | |
| 7,957,061 B1 | 6/2011 | Connor | |
| 8,009,358 B2 | 8/2011 | Zalevsky et al. | |
| 8,049,231 B2 | 11/2011 | El-Ghoroury et al. | |
| 8,098,265 B2 | 1/2012 | El-Ghoroury et al. | |
| 8,243,770 B2 | 8/2012 | El-Ghoroury et al. | |
| 8,567,960 B2 | 10/2013 | El-Ghoroury et al. | |
| 8,681,185 B2 | 3/2014 | Guncer | |
| 8,754,829 B2* | 6/2014 | Lapstun | G02B 26/10 345/6 |
| 8,854,724 B2* | 10/2014 | El-Ghoroury | G02B 26/101 359/298 |
| 8,928,969 B2* | 1/2015 | Alpaslan | G02B 3/0056 359/291 |
| 8,933,862 B2* | 1/2015 | Lapstun | G02B 26/10 345/6 |
| 8,970,646 B2 | 3/2015 | Guncer | |
| 9,036,255 B2* | 5/2015 | Loney | G02B 21/245 359/391 |
| 9,195,053 B2* | 11/2015 | El-Ghoroury | G02B 26/101 |
| 9,423,626 B2* | 8/2016 | Choi | G02B 26/005 |
| 9,494,787 B1 | 11/2016 | Bagwell | |
| 9,560,339 B2* | 1/2017 | Borowski | G01S 7/483 |
| 2002/0033932 A1 | 3/2002 | Yamamoto et al. | |
| 2002/0167485 A1 | 11/2002 | Hedrick | |
| 2003/0071813 A1* | 4/2003 | Chiabrera | G02B 27/225 345/426 |
| 2003/0103047 A1* | 6/2003 | Chiabrera | G02B 27/225 345/419 |
| 2003/0107804 A1 | 6/2003 | Dolgoff | |
| 2004/0212550 A1* | 10/2004 | He | G02B 27/2292 345/6 |
| 2005/0041296 A1 | 2/2005 | Hsiao et al. | |
| 2005/0068454 A1 | 3/2005 | Afsenius | |
| 2005/0082963 A1 | 4/2005 | Miyazaki et al. | |
| 2005/0088079 A1 | 4/2005 | Daniels | |
| 2005/0088453 A1 | 4/2005 | Ten | |
| 2005/0168699 A1 | 8/2005 | Suzuki et al. | |
| 2005/0179868 A1 | 8/2005 | Seo et al. | |
| 2006/0028400 A1* | 2/2006 | Lapstun | G02B 26/06 345/8 |
| 2006/0098285 A1 | 5/2006 | Woodgate et al. | |
| 2006/0181770 A1 | 8/2006 | Lee | |
| 2006/0238545 A1* | 10/2006 | Bakin | G02B 27/2214 345/613 |
| 2006/0238723 A1 | 10/2006 | El-Ghoroury | |
| 2006/0244918 A1 | 11/2006 | Cossairt et al. | |
| 2007/0046898 A1 | 3/2007 | Conner | |
| 2007/0058260 A1 | 3/2007 | Steenblik et al. | |
| 2007/0109813 A1 | 5/2007 | Copeland et al. | |
| 2007/0199645 A1* | 8/2007 | Yanai | G02B 27/1046 156/99 |
| 2007/0263298 A1 | 11/2007 | El-Ghoroury et al. | |
| 2008/0043014 A1 | 2/2008 | Tachi et al. | |
| 2008/0055903 A1 | 3/2008 | Akiyama | |
| 2008/0117491 A1 | 5/2008 | Robinson | |
| 2008/0136981 A1 | 6/2008 | Kawakami et al. | |
| 2008/0144174 A1 | 6/2008 | Lucente et al. | |
| 2008/0170293 A1 | 7/2008 | Lucente et al. | |
| 2008/0218853 A1 | 9/2008 | El-Ghoroury et al. | |
| 2008/0278808 A1 | 11/2008 | Redert | |
| 2009/0015918 A1 | 1/2009 | Morozumi et al. | |
| 2009/0086170 A1 | 4/2009 | El-Ghoroury et al. | |
| 2009/0219954 A1 | 9/2009 | Gollier | |
| 2009/0278998 A1 | 11/2009 | El-Ghoroury et al. | |
| 2010/0003777 A1 | 1/2010 | El-Ghoroury et al. | |
| 2010/0007804 A1 | 1/2010 | Guncer | |
| 2010/0026960 A1 | 2/2010 | Sprague | |
| 2010/0066921 A1 | 3/2010 | El-Ghoroury et al. | |
| 2010/0091050 A1 | 4/2010 | El-Ghoroury et al. | |
| 2010/0208342 A1* | 8/2010 | Olsen | H04N 13/0422 359/464 |
| 2010/0220042 A1 | 9/2010 | El-Ghoroury et al. | |
| 2010/0225679 A1 | 9/2010 | Guncer | |
| 2010/0245957 A1 | 9/2010 | Hudman et al. | |
| 2010/0259605 A1 | 10/2010 | So et al. | |
| 2011/0075257 A1* | 3/2011 | Hua | G02B 27/017 359/464 |
| 2011/0095184 A1 | 4/2011 | Tachibana et al. | |
| 2011/0096156 A1 | 4/2011 | Kim et al. | |
| 2011/0122239 A1 | 5/2011 | Baik et al. | |
| 2011/0134220 A1 | 6/2011 | Barbour et al. | |
| 2011/0181706 A1 | 7/2011 | Harrold et al. | |
| 2011/0304614 A1 | 12/2011 | Yasunaga | |
| 2012/0033113 A1 | 2/2012 | El-Ghoroury et al. | |
| 2012/0062988 A1 | 3/2012 | Watanabe | |
| 2012/0200681 A1 | 8/2012 | Yoshida et al. | |
| 2012/0200810 A1 | 8/2012 | Horikawa | |
| 2012/0242615 A1* | 9/2012 | Teraguchi | G06F 3/0412 345/174 |
| 2012/0305746 A1 | 12/2012 | Moon et al. | |
| 2012/0307223 A1 | 12/2012 | Van Zwet et al. | |
| 2012/0307357 A1* | 12/2012 | Choi | G02B 26/005 359/462 |
| 2012/0312957 A1* | 12/2012 | Loney | G02B 21/245 250/201.3 |
| 2013/0033586 A1 | 2/2013 | Hulyalkar | |
| 2013/0141895 A1* | 6/2013 | Alpaslan | G02B 3/0056 362/97.3 |
| 2013/0182225 A1 | 7/2013 | Stout | |
| 2013/0258451 A1* | 10/2013 | El-Ghoroury | G02B 26/101 359/298 |

(56) References Cited

U.S. PATENT DOCUMENTS

| | | | |
|---|---|---|---|
| 2013/0271763 A1 | 10/2013 | Li et al. | |
| 2013/0285885 A1 | 10/2013 | Nowatzyk et al. | |
| 2013/0300840 A1* | 11/2013 | Borowski | G01S 7/483 348/50 |
| 2013/0321675 A1* | 12/2013 | Cote | H04N 9/64 348/242 |
| 2014/0035959 A1* | 2/2014 | Lapstun | G02B 26/10 345/690 |
| 2014/0063489 A1 | 3/2014 | Steffey et al. | |
| 2014/0240809 A1* | 8/2014 | Lapstun | G02B 26/10 359/198.1 |
| 2014/0253993 A1* | 9/2014 | Lapstun | G02B 26/10 359/199.3 |
| 2014/0292620 A1* | 10/2014 | Lapstun | G02B 26/10 345/6 |
| 2014/0307064 A1 | 10/2014 | Horimai et al. | |
| 2015/0033539 A1* | 2/2015 | El-Ghoroury | G02B 26/101 29/428 |
| 2015/0277129 A1* | 10/2015 | Hua | G02B 27/0101 359/462 |
| 2016/0147067 A1* | 5/2016 | Hua | G02B 27/017 345/419 |
| 2016/0360125 A1 | 12/2016 | Yamamoto et al. | |
| 2018/0108711 A1* | 4/2018 | Teraguchi | G06F 3/0412 |

FOREIGN PATENT DOCUMENTS

| | | |
|---|---|---|
| JP | 9-109455 | 4/1997 |
| JP | 2007-025601 | 2/2007 |
| JP | 2007-525690 | 9/2007 |
| JP | 2008-304572 | 12/2008 |
| JP | 2008-545550 | 12/2008 |
| JP | 2009-506384 | 2/2009 |
| JP | 2010-068435 | 3/2010 |
| JP | 2010-510643 | 4/2010 |
| JP | 2010-117398 | 5/2010 |
| JP | 2011-100090 | 5/2011 |
| TW | 201126205 | 8/2011 |
| WO | WO-2004/094896 | 11/2004 |
| WO | WO-2006/125224 | 11/2006 |
| WO | WO-2008/064361 | 5/2008 |

OTHER PUBLICATIONS

Arai, Jun, "Depth-control method for integral imaging", *Optics Letters*, vol. 33, No. 3, (Feb. 1, 2008), pp. 279-281.
Arai, Jun, et al., "Effects of focusing on the resolution characteristics of integral photography", *J. Opt. Soc. Am. A*, vol. 20, No. 6, (Jun. 2003), pp. 996-1004.
Baasantseren, Ganbat, et al., "Computational Integral Imaging with Enhanced Depth Sensitivity", *Journal of Information Display*, vol. 10, No. 1, (Mar. 2009), pp. 1-5.
Baasantseren, Ganbat, et al., "Integral floating-image display using two lenses with reduced distortion and enhanced depth", *Journal of the SID*, vol. 18, No. 7, (2010), pp. 519-526.
Baasantseren, Ganbat, et al., "Viewing angle enhanced integral imaging display using two elemental image masks", *Optics Express*, vol. 17, No. 16, (Aug. 3, 2009), pp. 14405-14417.
Bagheri, Saeed, et al., "A Fast Optimization Method for Extension of Depth-of-Field in Three-Dimensional Task-Specific Imaging Systems", *Journal of Display Technology*, vol. 6, No. 10, (Oct. 2010), pp. 412-421.
Castro, Albertina, et al., "Integral imaging with large depth of field using an asymmetric phase mask", *Opt. Express*, vol. 15, (2007), pp. 10266-12073.
Choi, Heejin, et al., "Depth- and viewing-angle-enhanced 3-D/2-D switchable display system with high contrast ratio using multiple display devices and a lens array", *Journal of the SID*, 15/5, (2007), pp. 315-320.
Choi, Heejin, et al., "Depth-enhanced integral imaging using two parallel display devices", *Proceedings of the Pacific Rim Conference on Lasers and Electro-Optics 2005. CLEO/Pacific Rim 2005.*, (Aug. 2005), pp. 201-202.
Choi, Heejin, et al., "Depth-enhanced integral imaging with a stepped lens array or a composite lens array for three-dimensional display", *Proceedings of the 16th Annual Meeting of the IEEE Lasers and Electro-Optics Society, 2003. LEOS 2003*, vol. 2, (Oct. 27-28, 2003), pp. 730-731.
Choi, Heejin, et al., "Improved analysis on the viewing angle of integral imaging", *Applied Optics*, vol. 44, No. 12, (Apr. 20, 2005), pp. 2311-2317.
Choi, Heejin, et al., "Multiple-viewing-zone integral imaging using a dynamic barrier array for three-dimensional displays", *Optics Express*, vol. 11, No. 8, (Apr. 21, 2003), pp. 927-932.
Choi, Heejin, et al., "Wide-viewing-angle 3D/2D convertible display system using two display devices and a lens array", *Optics Express*, vol. 13, No. 21, (Oct. 17, 2005), pp. 8424-8432.
Date, Munekazu, et al., "Depth reproducibility of multiview depth-fused 3-D display", *Journal of the SID*, vol. 18, No. 7, (2010), pp. 470-475.
Goodman, Joseph W., "Introduction to Fourier Optics, Third Edition", Roberts & Company Publishers, (2005), pp. 138-145, 154-162, 186-212, 355-367.
Hahn, Joonku, et al., "Wide viewing angle dynamic holographic stereogram with a curved array of spatial light modulators", *Optics Express*, vol. 16, No. 16, (Aug. 4, 2008), pp. 12372-12386.
Hudson, Alex, "Could 3D TV be dangerous to watch?", *BBC News*, http://news.bbc.co.uk/2/hi/programmes/click_online/9378577.stm, (Jan. 28, 2011), 3 pp. total.
Hyun, Joobong, et al., "Curved Projection Integral Imaging Using an Additional Large-Aperture Convex Lens for Viewing Angle Improvement", *ETRI Journal*, vol. 31, No. 2, (Apr. 2009), pp. 105-110.
Jang, Ju-Seog, et al., "Depth and lateral size control of three-dimensional images in projection integral imaging", *Optics Express*, vol. 12, No. 16, (Aug. 9, 2004), pp. 3778-3790.
Jang, Ju-Seog, et al., "Three-dimensional projection integral imaging using micro-convex-mirror arrays", *Optics Express*, vol. 12, No. 6, (Mar. 22, 2004), pp. 1077-1083.
Jang, Jae-Young, et al., "Viewing angle enhanced integral imaging display by using a high refractive index medium", *Applied Optics*, vol. 50, No. 7, (Mar. 1, 2011), pp. B71-B76.
Javidi, Bahram, et al., "New developments in active and passive 3D image sensing, visualization, and processing", *Proc. of SPIE*, vol. 5986, (2005), pp. 598601-1 to 59806-11.
Javidi, Bahram, et al., "Orthoscopic, long-focal-depth integral imaging by hybrid method", *Proc. of SPIE*, vol. 6392, (2006), pp. 639203-1 to 639203-8.
Jung, Sungyong, et al., "Depth-enhanced integral-imaging 3D display using different optical path lengths by polarization devices or mirror barrier array", *Journal of the SID*, 12/4, (2004), pp. 461-467.
Jung, Sungyong, et al., "Viewing-angle-enhanced integral 3-D imaging using double display devices with masks", *Opt. Eng.*, vol. 41, No. 10, (Oct. 2002), pp. 2389-2390.
Jung, Sungyong, et al., "Viewing-angle-enhanced integral three-dimensional imaging along all directions without mechanical movement", *Optics Express*, vol. 11, No. 12, (Jun. 16, 2003), pp. 1346-1356.
Jung, Sungyong, et al., "Wide-viewing integral three-dimensional imaging by use of orthogonal polarization switching", *Applied Optics*, vol. 42, No. 14, (May 10, 2003), pp. 2513-2520.
Kavehvash, Zahra, et al., "Extension of depth of field using amplitude modulation of the pupil function for bio-imaging", *Proc. of SPIE*, vol. 7690, (2010), pp. 76900O-1 to 76900O-8.
Kim, Joohwan, et al., "A depth-enhanced floating display system based on integral imaging", *Proceedings of the 2006 SPIE-IS&T Electronic Imaging*, SPIE vol. 6055, 60551F, (2006), pp. 60551F-1 to 60551F-9.
Kim, Youngmin, et al., "Depth-enhanced integral floating imaging system with variable image planes using polymer-dispersed liquid-

(56) References Cited

OTHER PUBLICATIONS crystal films", *OSA Optics and Photonics Spring Congress*, St. Petersburg, Florida, USA, paper JMA2, (2008), 3 pp. total.
Kim, Yunhee, et al., "Depth-enhanced three-dimensional integral imaging by use of multilayered display devices", *Applied Optics*, vol. 45, No. 18, (Jun. 20, 2006), pp. 4334-4343.
Kim, Hwi, et al., "Image volume analysis of omnidirectional parallax regular-polyhedron three-dimensional displays", *Optics Express*, vol. 17, No. 8, (Apr. 13, 2009), pp. 6389-6396.
Kim, Yunhee, et al., "Point light source integral imaging with improved resolution and viewing angle by the use of electrically movable pinhole array", *Optics Express*, vol. 15, No. 26, (Dec. 24, 2007), pp. 18253-18267.
Kim, Youngmin, et al., "Projection-type integral imaging system using multiple elemental image layers", *Applied Optics*, vol. 50, No. 7, (Mar. 1, 2011), pp. B18-B24.
Kim, Hwi, et al., "The use of a negative index planoconcave lens array for wide-viewing angle integral imaging", *Optics Express*, vol. 16, No. 26, (Dec. 22, 2008), pp. 21865-21880.
Kim, Joowhan, et al., "Viewing region maximization of an integral floating display through location adjustment of viewing window", *Optics Express*, vol. 15, No. 20, (Oct. 1, 2007), pp. 13023-13034.
Kim, Yunhee, et al., "Viewing-angle-enhanced integral imaging system using a curved lens array", *Optics Express*, vol. 12, No. 3, (Feb. 9, 2004), pp. 421-429.
Lee, Byoungho, et al., "Viewing-angle-enhanced integral imaging by lens switching", *Optics Letters*, vol. 27, No. 10, (May 15, 2002), pp. 818-820.
Martinez-Corral, Manuel, et al., "Integral imaging with extended depth of field", *Proc. of SPIE*, vol. 6016, (2005), pp. 601602-1 to 601602-14.
Martinez-Corral, Manuel, et al., "Integral imaging with improved depth of field by use of amplitude-modulated microlens arrays", *Applied Optics*, vol. 43, No. 31, (Nov. 1, 2004), pp. 5806-5813.
Martinez-Corral, Manuel, et al., "Orthoscopic, long-focal-depth 3D Integral Imaging", *Proc. of SPIE*, vol. 6934, (2006), pp. 69340H-1 to 69340H-9.
Martinez-Cuenca, Raul, et al., "Enhanced depth of field integral imaging with sensor resolution constraints", *Optics Express*, vol. 12, No. 21, (Oct. 18, 2004), pp. 5237-5242.
Martinez-Cuenca, R., et al., "Enhanced viewing-angle integral imaging by multiple-axis telecentric relay system", *Optics Express*, vol. 15, No. 24, (Nov. 26, 2007), pp. 16255-16260.
Martinez-Cuenca, Raul, et al., "Extended Depth-of-Field 3-D Display and Visualization by Combination of Amplitude-Modulated Microlenses and Deconvolution Tools", *Journal of Display Technology*, vol. 1, No. 2, (Dec. 2005), pp. 321-327.
Min, Sung-Wook, et al., "Analysis of an optical depth converter used in a three-dimensional integral imaging system", *Applied Optics*, vol. 43, No. 23, (Aug. 10, 2004), pp. 4539-4549.
Min, Sung-Wook, et al., "New Characteristic Equation of Three-Dimensional Integral Imaging System and its Application", *Japanese Journal of Applied Physics*, vol. 44, No. 2, (2005), pp. L71-L74.

Navarro, H., et al., "3D integral imaging display by smart pseudoscopic-to-orthoscopic conversion (SPOC)", *Optics Express*, vol. 18, No. 25, (Dec. 6, 2010), pp. 25573-25583.
Navarro, Hector, et al., "Method to Remedy Image Degradations Due to Facet Braiding in 3D Integral-Imaging Monitors", *Journal of Display Technology*, vol. 6, No. 10, (Oct. 2010), pp. 404-411.
Okano, Fumio, et al., "Depth Range of a 3D Image Sampled by a Lens Array with the Integral Method", *IEEE 3DTV-CON*, (2009), 4 pp. total.
Okoshi, Takanori, "Three-Dimensional Imaging Techniques", Academic Press, Inc. Publishers, (1976), pp. 43-123, 295-349, 351-357.
Park, Soon-Gi, et al., "2D/3D convertible display with enhanced 3D viewing region based on integral imaging", *Proc. of the SPIE*, 7524, (2010), 9 pp. total.
Park, Jae-Hyeung, et al., "Analysis of viewing parameters for two display methods based on integral photography", *Applied Optics*, vol. 40, No. 29, (Oct. 10, 2001), pp. 5217-5232.
Park, Chan-Kyu, et al., "Depth-extended integral imaging system based on a birefringence lens array providing polarization switchable focal lengths", *Optics Express*, vol. 17, No. 21, (Oct. 12, 2009), pp. 19047-19054.
Park, Jae-Hyeung, et al., "Integral imaging with multiple image planes using a uniaxial crystal plate", *Optics Express*, vol. 11, No. 16, (Aug. 11, 2003), pp. 1862-1875.
Park, Gilbae, et al., "Multi-viewer tracking integral imaging system and its viewing zone analysis", *Optics Express*, vol. 17, No. 20, (Sep. 28, 2009), pp. 17895-17908.
Park, Jae-Hyeung, et al., "Recent progress in three-dimensional information processing based on integral imaging", *Applied Optics*, vol. 48, No. 34, (Dec. 1, 2009), pp. H77-H94.
Ponce-Diaz, Rodrigo, et al., "Digital Magnification of Three-Dimensional Integral Images", *Journal of Display Technology*, vol. 2, No. 3, (Sep. 2006), pp. 284-291.
Saavedra, G., et al., "Digital slicing of 3D scenes by Fourier filtering of integral images", *Optics Express*, vol. 16, No. 22, (Oct. 27, 2008), pp. 17154-17160.
Song, Yong-Wook, et al., "3D object scaling in integral imaging display by varying the spatial ray sampling rate", *Optics Express*, vol. 13, No. 9, (May 2, 2005), pp. 3242-3251.
Stern, Adrian, et al., "3-D computational synthetic aperture integral imaging (COMPSAII)", *Optics Express*, vol. 11, No. 19, (Sep. 22, 2003), pp. 2446-2451.
The Telegraph, "Samsung warns of dangers of 3D television", *The Telegraph*, http://www.telegraph.co.uk/technology/news/7596241/Samsung-warns-of-dangers-of-3D-television.html, (Apr. 16, 2010), 2 pp. total.
Tolosa, A., et al., "Optical implementation of micro-zoom arrays for parallel focusing in integral imaging", *J. Opt. Soc. Am. A*, vol. 27, No. 3, (Mar. 2010), pp. 495-500.
Wakabayashi, Daisuke, "Panasonic, Japan Work on 3-D Safety", *The Wall Street Journal*, http://blogs.wsj.com/digits/2011/01/06/panasonic-working-with-japan-on-3-d-standards/, (Jan. 6, 2011), 2 pp. total.
"Office Action Dated Jun. 12, 2017; Taiwanese Patent Application No. 103109831", (dated Jun. 12, 2017).
"Notice of Allowance Dated Jan. 25, 2018; Taiwanese Patent Application No. 103109831", dated Jan. 25, 2018.

\* cited by examiner

Top View

Side View

2D Tiling in x and y axes

3D Tiling

3D LIGHT FIELD DISPLAYS AND METHODS WITH IMPROVED VIEWING ANGLE, DEPTH AND RESOLUTION

CROSS-REFERENCE TO RELATED APPLICATIONS

This application is a continuation of International Application No. PCT/US2014/029623 Filed Mar. 14, 2014 which claims the benefit of U.S. Provisional Patent Application No. 61/800,818 filed Mar. 15, 2013.

BACKGROUND OF THE INVENTION

1. Field of the Invention

This invention relates generally to image and video displays, more particularly to 3D light field imaging systems and the construction methods of 3D light field imaging systems with large viewing angle, high frequency and extended depth. The term "light field" describes the transmission and modulation of the light including, direction, amplitude, frequency and phase, and therefore encapsulates imaging systems that utilize techniques such as holography, integral imaging, stereoscopy, multi-view imaging, Free-viewpoint TV (FTV) and the like. The invention described herein details an easy to manufacture, high brightness, no color break up, wide viewing angle 3D light field imaging systems that don't sacrifice image resolution or image depth.

2. Prior Art

REFERENCES CITED

[1] M. E. Lucente, T. Huang, T. L. Burnett, M. A. Klug, A. W. Heath, M. E. Holzbach, "DYNAMIC AUTOSTEREOSCOPIC DISPLAYS", U.S. Patent Application Publication No: US 2008/0144174 A1, Jun. 19, 2008

[2] M. E. Lucente, T. Huang, T. L. Burnett, M. A. Klug, A. W. Heath, M. E. Holzbach, "DYNAMIC AUTOSTEREOSCOPIC DISPLAYS", U.S. Patent Application Publication No: US 2008/0170293 A1, Jul. 17, 2008

[3] J. W. Goodman, "Introduction to Fourier Optics", Roberts and Company Publishers, 3 ed., Dec. 10, 2004

[4] S. E. Guncer, "Image Construction Based Video Display System", United States Patent Application 20100007804, Jan. 14, 2010

[5] S. E. Guncer, "Multi-Pixel Addressing Method for Video Display Drivers", United States Patent Application 20100225679, Sep. 9, 2010

[6] D. Wakabayashi, "Panasonic, Japan Work on 3D Safety", http://blogs.wsj.com/digits/2011/01/06/panasonic-working-with-japan-on-3-d-standards/WSJ Blogs, Digits, Technology News and Insights, Jan. 6, 2011

[7] Technology News, "Samsung warns of dangers of 3D television", http://www.telegraph.co.uk/technology/news/7596241/Samsung-warns-of-dangers-of-3D-television.html, The Telegraph, Jan. 28, 2011

[8] A. Hudson, "Could 3D television be dangerous to watch?", http://news.bbc.co.uk/2/hi/programmes/click_online/9378577.stm, BBC News, Jan. 28, 2011

[9] H. S. El-Ghoroury, D. A. McNeill, J. Cai, "Microstructure based screen system for use in rear projection array display systems", U.S. Pat. No. 7,835,079, Nov. 16, 2010

[10] H. S. El-Ghoroury, R. G. Brown, D. A. McNeill, H. Denboer, A. J. Lanzone, "Quantum photonic imagers and methods of fabrication thereof", U.S. Pat. No. 7,623,560, Nov. 24, 2009

[11] H. S. El-Ghoroury, "Low profile, large screen display using a rear projection array system" U.S. Pat. No. 7,334,901, Feb. 26, 2008

[12] H. S. El-Ghoroury, R. G. Brown, D. A. McNeill, H. Denboer, A. J. Lanzone, "Quantum photonic imagers and methods of fabrication thereof", U.S. Pat. No. 7,767,479, Aug. 3, 2010

[13] H. S. El-Ghoroury, R. G. Brown, D. A. McNeill, H. Denboer, A. J. Lanzone, "Quantum photonic imagers and methods of fabrication thereof", United States Patent Application 20020116165, Nov. 9, 2010

[14] H. S. El-Ghoroury, "Matched instruction set processor systems and method, system, and apparatus to efficiently design and implement matched instruction set processor systems by mapping system designs to re-configurable hardware platforms", U.S. Pat. No. 7,829,902, Aug. 22, 2002

[15] H. S. El-Ghoroury, A. Majumder, R. G. Brown, A. J. Lanzone, "Hierarchical multicolor primaries temporal multiplexing system", U.S. Pat. No. 8,098,265, Jan. 17, 2012

[16] Z. Y. Alpaslan, H. S. El-Ghoroury, J. Cai, D. A. McNeill, "Spatio-Optical Directional Light Modulator", United States Patent Application 20130141895, Jun. 6, 2013

[17] H. S. El-Ghoroury, Z. Y. Alpaslan, J. Cai, M. Meiers, P. Warner, D. A. McNeill, "Spatio-Temporal Directional Light Modulator", United States Patent Application 20130258451, Oct. 3, 2013

[18] S. W. Min, J. Kim, and B. Lee, "New characteristic equation of three-dimensional integral imaging system and its applications", Japanese J. Appl. Phys. 44, pp. L71-L74, 2005

[19] T. Okoshi, "Three-Dimensional Imaging Techniques" (Academic, 1976)

[20] J.-H. Park, S.-W. Min, S. Jung, and B. Lee, "Analysis of viewing parameters for two display methods based on integral photography", Appl. Opt. 40, 5217-5232 (2001)

[21] B. Lee, S. Jung, and J.-H. Park, "Viewing-angle-enhanced integral imaging by lens switching," Opt. Lett. 27, 818-820 (2002)

[22] S. Jung, J.-H. Park, B. Lee, B. Javidi, "Viewing-angle-enhanced integral 3-D imaging using double display devices with masks", Opt. Eng. 41, 2389-2390 (2002)

[23] H. Choi, S.-W. Min, S. Jung, J.-H. Park and B. Lee, "Multiple-viewing-zone integral imaging using a dynamic barrier array for three-dimensional Displays", Opt. Express 11 (2003)

[24] S. Jung, J.-H. Park, H. Choi, and B. Lee, "Wide-viewing integral three-dimensional imaging by use of orthogonal polarization switching", Appl. Opt. 42, 2513-2520 (2003)

[25] S. Jung, J.-H. Park, H. Choi, and B. Lee, "Viewing-angle-enhanced integral three-dimensional imaging along all directions without mechanical movement", Opt. Express 11, 1346-1356 (2003)

[26] A. Stern and B. Javidi, "3-D computational synthetic aperture integral imaging (COMPSAII)", Opt. Express 11, 2446-2451 (2003)

[27] Y. Kim, J.-H. Park, H. Choi, S. Jung, S.-W. Min, and B. Lee, "Viewing-angle-enhanced integral imaging system using a curved lens array", Opt. Express 12, 421-429 (2004)

[28] J.-S. Jang, B. Javidi, "Three-dimensional projection integral imaging using micro-convex-mirror arrays", Opt. Express 12, 1077-1083 (2004)

[29] H. Choi, J.-H. Park, J. Kim, S.-W. Cho, and B. Lee, "Wide-viewing-angle 3D/2D convertible display system using two display devices and a lens array." Opt. Express 13, 8424-8432 (2005)

[30] H. Choi, Y. Kim, J.-H. Park, S. Jung, and B. Lee, "Improved analysis on the viewing angle of integral imaging", Appl. Opt. 44, 2311-2317 (2005)

[31] H. Choi, Y. Kim, J. Kim, S.-W. Cho, B. Lee, "Depth- and viewing-angle-enhanced 3-D/2-D switchable display system with high contrast ratio using multiple display devices and a lens array", Journal of the SID 15/5, 315-320 (2007)

[32] J. Kim, S.-W. Min and B. Lee, "Viewing region maximization of an integral floating display through location adjustment of viewing window", Opt. Express 15, (2007)

[33] R. Martínez-Cuenca, H. Navarro, G. Saavedra, B. Javidi, and M Martínez-Corral, "Enhanced viewing-angle integral imaging by multiple axis telecentric relay system", Opt. Express 15, 16255-16260 (2007)

[34] Y. Kim, J. Kim, J.-M. Kang, J.-H. Jung, H. Choi and B. Lee, "Point light source integral imaging with improved resolution and viewing angle by the use of electrically movable pinhole array", Opt. Express 15, 18253-18267 (2007)

[35] J. Hahn, H. Kim, Y. Lim, G. Park, and B. Lee, "Wide viewing angle dynamic holographic stereogram with a curved array of spatial light modulators", Opt. Express 16, 12372-12386 (2008)

[36] H. Kim, J. Hahn, and B. Lee, "The use of a negative index planoconcave lens array for wide-viewing angle integral imaging", Opt. Express 16, 21865-21880 (2008)

[37] J.-H. Park, K. Hong, and B. Lee, "Recent progress in three-dimensional information processing based on integral imaging," Appl. Opt. 48, H77-H94 (2009)

[38] J. Hyun, D.-C. Hwang, D.-H. Shin, B.-G. Lee, and E.-S. Kim, "Curved Projection Integral Imaging Using an Additional Large-Aperture Convex Lens for Viewing Angle Improvement", ETRI Journal 31, No. 2 (2009)

[39] G. Baasantseren, J.-H. Park, K.-C. Kwon, and N. Kim, "Viewing angle enhanced integral imaging display using two elemental image masks", Opt. Express 17, 14405-14417 (2009)

[40] G. Park, J.-H. Jung, K. Hong, Y. Kim, Y.-H. Kim, S.-W. Min, and B. Lee, "Multi-viewer tracking integral imaging system and its viewing zone analysis", Opt. Express 17, 17895-17908 (2009)

[41] S.-G. Park; B.-S. Song; S.-W. Min, "2D/3D convertible display with enhanced 3D viewing region based on integral imaging", Proc. of SPIE 7524 (2010)

[42] J.-Y. Jang, H.-S. Lee, S. Cha, and S.-H. Shin, "Viewing angle enhanced integral imaging display by using a high refractive index medium", APPL. OPTICS 50, B71-B76 (2011)

[43] J.-H. Park, S. Jung, H. Choi, and B. Lee, "Integral imaging with multiple image planes using a uniaxial crystal plate," Opt. Express 11, 1862-1875 (2003)

[44] H. Choi, J.-H. Park, J. Hong, and B. Lee, "Depth-enhanced integral imaging with a stepped lens array or a composite lens array for three-dimensional display", IEEE (2003)

[45] J. Arai, H. Hoshino, M. Okui, and F. Okano, "Effects of focusing on the resolution characteristics of integral photography," J. Opt. Soc. Am. A 20, 996-1004 (2003)

[46] R. Martínez-Cuenca, G. Saavedra, M. Martínez-Corral, and B. Javidi, "Enhanced depth of field integral imaging with sensor resolution constraints," Opt. Express 12, 5237-5242 (2004)

[47] S. Jung, J. Hong, J.-H. Park, Y. Kim, B. Lee, "Depth-enhanced integral-imaging 3D display using different optical path lengths by polarization devices or mirror barrier array", Journal of the SID 12/4, 461-467 (2004)

[48] M. Martínez-Corral, B. Javidi, R. Martínez-Cuenca, and G. Saavedra, "Integral Imaging with Improved Depth of Field by Use of Amplitude-Modulated Microlens Arrays," Appl. Opt. 43, 5806-5813 (2004)

[49] S.-W. Min, J. Hong, and B. Lee, "Analysis of an Optical Depth Converter Used in a Three-Dimensional Integral Imaging System," Appl. Opt. 43, 4539-4549 (2004)

[50] J.-S. Jang and B. Javidi, "Depth and lateral size control of three-dimensional images in projection integral imaging," Opt. Express 12, 3778-3790 (2004)

[51] B. Javidi, E. Tajahuerce, M. Martínez-Corral, T. J. Naughton, and Y. Frauel, "New developments in active and passive 3D image sensing, visualization, and processing", Proc. of SPIE Vol. 5986, 598601-1-598601-11 (2005)

[52] Y.-W. Song, B. Javidi, and F. Jin, "3D object scaling in integral imaging display by varying the spatial ray sampling rate," Opt. Express 13, 3242-3251 (2005)

[53] R. Martínez-Cuenca, G. Saavedra, M. Martínez-Corral, and B. Javidi, "Extended Depth-of-Field 3-D Display and Visualization by Combination of Amplitude-Modulated Microlenses and Deconvolution Tools", JOURNAL OF DISPLAY TECHNOLOGY, VOL. 1, NO. 2, DECEMBER 2005

[54] M. Martínez-Corral, R. Martínez-Cuenca, G. Saavedra, and B. Javidi, "Integral imaging with extended depth of field", Proc. of SPIE Vol. 6016, 601602-1-601602-14 (2005)

[55] J. Kim, S. Min, Y. Kim, S.-W. Cho, H. Choi, and B. Lee, "Depth-enhanced floating display system based on integral imaging." Electronic Imaging, USA, January 2006

[56] H. Choi, J. H. Park, Y. Kim, J. Kim, S.-W. Cho, B. Lee; "Depth-enhanced integral imaging using two parallel display devices", CLEO/Pacific Rim 2005, 201-202 (2006)

[57] Y. Kim, J.-H. Park, H. Choi, J. Kim, S.-W. Cho, and B. Lee, "Depth-enhanced three-dimensional integral imaging by use of multilayered display devices," Appl. Opt. 45, 4334-4343 (2006)

[58] R. Ponce-Díaz, R. Martínez-Cuenca, M. Martínez-Corral, B. Javidi, and Y. W. Song, "Digital Magnification of Three-Dimensional Integral Images", JOURNAL OF DISPLAY TECHNOLOGY 2, 284-291 (2006)

[59] M. Martínez-Corral, R. Martínez-Cuenca, G. Saavedra, and B. Javidi, "Orthoscopic, long-focal-depth 3D Integral Imaging", Proc. of SPIE Vol. 6934, H-1-H-9 (2009)

[60] B. Javidi, R. Martínez-Cuenca, G. Saavedra, and M. Martínez-Corral, "Orthoscopic, long-focal-depth integral imaging by hybrid method", Proc. of SPIE Vol. 6392, 639203-1-8 (2006)

[61] H. Choi, Y. Kim, J. Kim, S.-W. Cho, B. Lee, "Depth- and viewing-angle-enhanced 3-D/2-D switchable display system with high contrast ratio using multiple display devices and a lens array", Journal of the SID 15/5, 315-320 (2007)

[62] A. Castro, Y. Frauel, and B. Javidi, "Integral imaging with large depth of field using an asymmetric phase mask," Opt. Express 15, 10266-10273 (2007)

[63] Y. Kim, J. Kim, Y. Kim, J.-H. Jung, and B. Lee, "Depth-enhanced integral floating imaging system with variable image planes using polymer-dispersed liquid-crystal films," Digital Holography and Three-Dimensional Imaging (OSA Optics and Photonics Spring Congress), St. Petersburg, Fla., USA, paper JMA2 (2008)

[64] J. Arai, H. Kawai, M. Kawakita, and F. Okano, "Depth-control method for integral imaging," Opt. Lett. 33, 279-281 (2008)

[65] G. Saavedra, R. Martínez-Cuenca, M. Martínez-Corral, H. Navarro, M. Daneshpanah, and B. Javidi, "Digital slicing of 3D scenes by Fourier filtering of integral images" OPT. EXPRESS 16, 17154-17160 (2008)

[66] J.-H. Park, K. Hong, and B. Lee, "Recent progress in three-dimensional information processing based on integral imaging," Appl. Opt. 48, H77-H94 (2009)

[67] G. Baasantseren, J.-H. Park, N. Kim, and K.-C. Kwon, "Computational Integral Imaging with Enhanced Depth Sensitivity", Journal of Information Display, 10, 1-5 (2009)

[68] F. Okano, J. Arai, and M. Kawakita, "DEPTH RANGE OF A 3D IMAGE SAMPLED BY A LENS ARRAY WITH THE INTEGRAL METHOD", IEEE 3DTV-CON (2009)

[69] C.-K. Park, S.-S. Lee, and Yong-Seok Hwang, "Depth-extended integral imaging system based on a birefringence lens array providing polarization switchable focal lengths," Opt. Express 17, 19047-19054 (2009)

[70] H. Kim, J. Hahn, and B. Lee, "Image volume analysis of omnidirectional parallax regular-polyhedron three-dimensional displays," Opt. Express 17, 6389-6396 (2009)

[71] G. Baasantseren, J.-H. Park, M.-U. Erdenebat, S.-W. Seo, and N. Kim, "Integral floating-image display using two lenses with reduced distortion and enhanced depth", J. Soc. Inf. Display 18, 519 (2010)

[72] S. Bagheri, Z. Kavehvash, K. Mehrany, and B. Javidi, "A fast optimization method for extension of depth-of-field in three-dimensional task-specific imaging systems," *J. of Display Technology* (2010)

[73] M. Date, Y. Andoh, H. Takada, Y. Ohtani, N. Matsuura, "Depth reproducibility of multiview depth-fused 3-D display", Journal of the SID 18/7, 470-475 (2010)

[74] Z. Kavehvash, S. Bagheri, K. Mehrany, B. Javidi, E. Sanchez and M. Martinez-Corral, "Extension of depth of field using amplitude modulation of the pupil function for bio-imaging", Proc. of SPIE Vol. 7690, 769000-1-769000-8 (2010)

[75] A. Tolosa, R. Martínez-Cuenca, A. Pons, G. Saavedra, M. Martínez-Corral, and B. Javidi, "Optical implementation of micro-zoom arrays for parallel focusing in integral imaging," J. Opt. Soc. Am. A 27, 495-500 (2010)

[76] H. Navarro, R. Martínez-Cuenca, G. Saavedra, M. Martínez-Corral, and B. Javidi, "3D integral imaging display by smart pseudoscopic-to-orthoscopic conversion (SPOC)," Opt. Express 18, 25573-25583 (2010)

[77] H. Navarro, R. Martínez-Cuenca, A. Molina-Martín, M. Martínez-Corral, G. Saavedra, and B. Javidi, "Method to Remedy Image Degradations Due to Facet Braiding in 3D Integral-Imaging Monitors," J. Display Technol. 6, 404-411 (2010)

[78] Y. Kim, S. Park, S.-W. Min, and B. Lee, "Projection-type integral imaging system using multiple elemental image layers," Appl. Opt. 50, B18-B24 (2011)

OVERVIEW 3D displays have been gaining popularity since the introduction of glasses based 3D TVs by all the major TV manufacturers in 2010. The biggest shortcoming of the currently available technology has been identified as the 3D glasses, (see Refs. [6], [7] and [8]), which can be categorized as either active or passive. In general, glasses based 3D display technology is uncomfortable for the viewers to use for long time periods and pose challenges for people who require prescription glasses.

Autostereoscopic displays use directional modulators (such as parallax barriers or lenticular sheets) attached to a display surface to create a 3D effect without requiring glasses. Commercially available autostereoscopic displays typically use horizontal parallax to present the 3D information to the viewer. The main problems of such autostereoscopic display technology are the limited viewing angle and the limited resolution per view, resulting in a lower quality 3D image. Using this autostereoscopic technology, a display's pixels are divided into two or more views to create motion parallax in the horizontal direction. Within the limits of a predefined viewing box, a viewer can see a stereoscopic 3D picture and in some cases even a 3D view from a slightly different angle of the same 3D scene. However, because the pixels are divided equally to each view, the views have a much smaller resolution than the actual 3D image, resulting in low resolution images. In addition, within the viewing box, the user has to keep his head vertical, otherwise the 3D effect disappears.

A more natural 3D effect is achieved with full parallax 3D display technology. Two of the most widely sought after full parallax digital 3D display technologies are integral imaging and holography. In addition to horizontal parallax, these technologies also have vertical parallax, such that a vertical movement of the viewer will show a different view of the 3D scene. Full parallax displays generally have an order of magnitude or more views than horizontal parallax only displays. Arranging these views densely creates a very natural 3D image that does not change by a user moving or tilting his head. Two of the main differences between the digital holography and integral imaging technologies are the view generation and illumination requirements. In digital holography, view generation requires Fourier transformation and is more computationally intensive than integral imaging view generation, which predominantly requires pixel shuffling and relatively much less computation. Digital holography also requires a coherent light source for illumination of its fringes which limits the brightness and size of the 3D image achievable. Therefore integral imaging is the preferred method when it comes to view generation and illumination requirements in pragmatically generating full parallax 3D images.

BACKGROUND

FIG. 1 shows the concept of integral imaging technology. In integral imaging, the display performs the spatial and magnitude modulation of the pixels while the lens array performs the directional modulation of the pixels. Intersection of directionally modulated light rays emanating from at least two different lenses creates a light distribution that synthesizes a 3D image of a floating object in the air. Even though integral imaging technology is the preferred method of generating full parallax 3D images, it has its own limitations. As described in Ref. [19] and illustrated in FIG. 2, any Integral Imaging display can be described by three parameters: image resolution, viewing angle and image depth. Image resolution is defined as the inverse of the image pixel pitch, viewing angle is defined as the angular region where the 3D image is seen (or perceived) without cracking or flipping, and the image depth is defined as the thickness of the 3D volume around the plane where the image was integrated. The characteristic equation of an Integral Imaging display describes the relationship between these three parameters and can be expressed as $$R_I^2 \Delta z_m \tan\left(\frac{\Omega}{2}\right) = R_X \qquad \text{Eq. 1}$$

$$R_I = \frac{1}{P_I} \qquad \text{Eq. 2}$$

$$R_X = \frac{1}{P_X} \qquad \text{Eq. 3}$$

Where $R_I$ is the resolution of the image, $P_I$ is the pixel pitch of the image, $\Delta z_m$ is the maximum achievable depth in the generated 3-D image, $\Omega$ is the viewing angle, $R_x$ is the spatial modulator device resolution and $P_x$ is the spatial modulator device pixel pitch. As seen from Eq. 1, Eq. 2, Eq. 3, as the spatial modulator device resolution increases, the overall 3-D integral image quality increases. This means the best image quality would be possible with the smallest pixel pitch. Eq. can be interpreted as the total image quality bandwidth of an integral imaging display. For an integral imaging display this quality is limited by the pixel pitch of the spatial modulator and to improve any one of these parameters, a designer is usually faced with having to make the combination of the other two parameters worse.

Viewing Angle Improvement Methods

There have been attempts at improving the viewing angle of integral imaging displays without worsening the other two parameters, but these attempts were impractical to manufacture, offered little improvement, or degraded an aspect of a display not explained in the characteristic equation so much that the resulting image was unusable.

Viewing angle improvement methods for integral imaging displays can be characterized in to 5 main methods: Mask based methods (i.e., Moving mask, Sliding mask, Two displays and a mask, Movable pinhole array, Two masks, Multi Axis Relay, Moving lens and tilted barriers, Orthogonal polarization switching sheet, Two displays with orthogonal polarization switching, Transparent display device as a dynamic mask, Three displays), Micro Convex Mirror Array, Multi-viewer tracking, High Refractive Index Medium, and Curved Lens Array Methods (i.e., Curved lens array with barrier and Curved projection with a Fresnel lens)

In mask based methods, a mask is placed between the display device and the lens array so that each unmasked lens has access to an elemental image region that is larger than its diameter. FIG. 3 shows that the top most lens with no mask can have access to the elemental image pixels that would be previously reserved for the masked lens above it. When the mask moves to its next position, the elemental images are regenerated to match the positions of the new unmasked lenses. There are also non-moving mask based methods in which two displays are combined with a beam splitter, two masks are used simultaneously, masks and telecentric lenses are used simultaneously, masking is accomplished by use of a polarization switching screen and a polarizing sheet, masking is accomplished by using transparent LCD screens or masking is accomplished by tilting barriers attached to a moving lens array.

The main problem associated with the mask based methods is that at any time only half of the lenses in the lens array have access to all the pixels in the display device. This means that either the pixels in the display device have to be shared using time multiplexing, increasing the complexity and the processing requirements of the device, or the number of pixels has to be increased by adding another display device, increasing the space occupied by the display system. The maximum reported viewing angle achieved by mask based methods is 60 degrees.

Micro convex mirror array systems project an array of elemental images on to an array of acrylic convex lenses. The 4% reflection that comes from these lenses creates a very dim virtual image with up to 70 degrees viewing angle. In virtual mode the lens array is between the observer and the 3D image (i.e., the image appears to be floating behind the lens array). There are four problems associated with this method. The first problem is the manufacturability of micro convex mirror arrays. As of now there is no practical way to manufacture micro convex mirror arrays therefore the method had to use the reflection from the convex lens array. Because the reflectance of the convex lenses is only 4% the brightness of the image suffers. The third problem is the supporting of only the virtual mode integral images limits the usability and attractiveness of the display. Finally the fourth problem is the space that is taken by the system. As with any front projection system the projectors have to be located behind the observers to project the image on the screen, limiting the usability of the display system.

Multi-viewer tracking methods determines an observer's position and adjust the elemental images to appear undistorted at that position. Tracking the user and adjusting the elemental images can be done for more than one user and requires time multiplexing. The viewing angle achievable by this method is limited by the amount of adjustments that can be made to elemental images and the lens numerical aperture. There are three problems associated with this method. First, time multiplexing increases the image processing requirements of the system and reduces the brightness of the images available to each observer. Second, there is a need for an external system to track the movements of the observer(s) and synchronize it with the elemental generation, increasing the space requirements and complexity of the system. Third, this method creates a lot of crosstalk among the lenses in the lens array and the image quality suffers.

In high index medium method, a high index medium is inserted between the display device and a plano-convex lens array. This arrangement creates a system with increased numerical aperture, which translates into wider viewing angles. The maximum viewing angle reported by this method is 64 degrees. There are two problems associated with this method. First, because the numerical aperture is increased the image depth and/or pixel size suffers in this method. Second, as the refractive index of the medium increases its transmissivity decreases, reducing the total viewing brightness of the system.

In curved lens array methods, a curved lens array or a flat lens array and a large aperture lens combination is used to create a real mode integral image. The viewing angle is enhanced because of the added curvature from the arrangement of the lenses in the lens array or from the large aperture lens. This method is a rear projection based method whereby barriers are used between the lenses in the lens array to prevent crosstalk. The maximum reported viewing angle for this method is 60 degrees. There are three disadvantages to this method. First, difficulties in manufacturability prevent making of thin curved lens arrays and large aperture lenses. Second, because this is a rear projection method the space requirements are larger than regular integral imaging displays.

In addition to all the specific problems the described prior art methods have, all of these methods have common image quality problems arising from the display technology they use. When the underlying display technology is flat panel LCD or LCOS projection, the pixels consist of spatially adjacent red, green and blue sub-pixels. In the 3D image these sub-pixels create color break up and reduce the quality of the image. When the underlying technology is DLP projection, the color break up can be reduced by overlapping the red, green and blue components of the image, however the light source and the illumination optics required to operate this technology combined with the complex electronics synchronization and projection optics requires a large space to operate limiting the usefulness of the technology.

Depth and Resolution Improvement Methods

Published depth improvement methods for integral imaging displays can be characterized into nine different methods. The most basic depth improvement method is the depth priority integral imaging in which the lens array is located at its focal length away from the display device. This enables the display system to achieve the highest depth of field by displaying real and virtual images at the same time.

In these methods lenslets with different focal lengths arranged spatially combined with a time multiplexed movement of the lens array, the lenslets can create increase the depth of field by adding multiple central depth planes.

Multi layered display devices work by using two or more display devices (some transparent) to create multiple central depth planes and overlapping marginal depth planes.

By zooming elemental images electronically the depth could be controlled. If this is done fast enough with time multiplexing we can control depth by changing the elemental images only, but the image resolution also changes.

A variation of multiple display method is multiple displays with time multiplexing. Usually one device is dedicated to display a virtual image another is dedicated to display a real image and using masks the viewing angle is also improved.

Composite lens array or stepped lens array based systems increase the number of central depth planes by fabricating elemental lenses on two different lens planes. The main idea is changing the lens to display distance. Lenses can also be moved with time multiplexing to fill the whole volume.

Similar effects can be achieved using different optical path lengths. Examples of this include using polarization devices with which image planes are multiplexed with two different central depth planes using a beam splitter. In another method a mirror barrier array which rotates mirrors by 45 degrees increases the optical path length from the display to the lens array and causes a new central depth plane to materialize.

BRIEF DESCRIPTION OF THE DRAWINGS

In the following description, like drawing reference numerals are used for the like elements, even in different drawings. The matters defined in the description, such as detailed construction and elements, are provided to assist in a comprehensive understanding of the exemplary embodiments. However, the present invention can be practiced without those specifically defined matters. Also, well-known functions or constructions are not described in detail since they would obscure the invention with unnecessary detail. In order to understand the invention and to see how it may be carried out in practice, a few embodiments of it will now be described, by way of non-limiting example only, with reference to accompanying drawings, in which.

DETAILED DESCRIPTION OF THE PREFERRED EMBODIMENTS

The invention described herein details an easy to manufacture, high brightness, no color break up, wide viewing angle integral imaging system that does not sacrifice image resolution or image depth.

With the availability of high brightness, vertical stacking, small pixel pitch displays, Ref. [10], [12] and [13], a full parallax integral imaging display with a wide viewing angle and improved picture quality is feasible. This invention presents a method of improving the viewing angle of an integral imaging display without degrading the image resolution or the image depth. The invention eliminates the color distortions found in other integral imaging displays and achieves very high brightness in a very small volume.

These new types of emissive solid state displays have 10 μm or smaller pixel pitch, high dynamic range, and fast modulation speed, Refs [12], [13]. These types of displays, which can be driven by multi-core matched instruction set processors Ref [14] that are bonded to their photonic layer, are able to perform complex image processing operations on their input data without the need for a supporting graphics computer. Examples of these complex processing operations include, light field rendering, video decompression or video decoding Ref [4] and [5], real time color and luminance uniformity correction, color gamut adjustments [15], gamma adjustments and the like. These displays which have their own video decompression capabilities can accept compressed input which makes them ideal for use in full parallax light field imaging due to high bandwidth requirements imposed by the full parallax property. Since these emissive solid state displays with small pixel pitch require a very small number of connections (power, input data and some control lines) to operate, they can be utilized in unique spatio-optical Ref. [16] and spatio-temporal Ref. [17] light field modulator configurations. In these unique spatio-optical and spatio-temporal light field modulator configurations, micro patterned screens can be combined with the emissive displays and the combined structure can be moved with the help of gimbals to increase the total viewing angle, total number of directional light rays, total depth displayed by the display and the displayed image resolution.

This invention details new methods of using emissive solid state displays with small pixel pitch and processing capabilities to create full parallax light field displays.

Prior art methods described in the previous section cannot be used to create practical displays due to their limitations by the use of displays with low dynamic range, low brightness, low modulation speed, and no compressed input capability. The invention presented herein makes use of an imager with high dynamic range, high brightness, high modulation speed and compressed input capability. Therefore it can overcome all the prior art limitations in practical ways.

Figure 1:
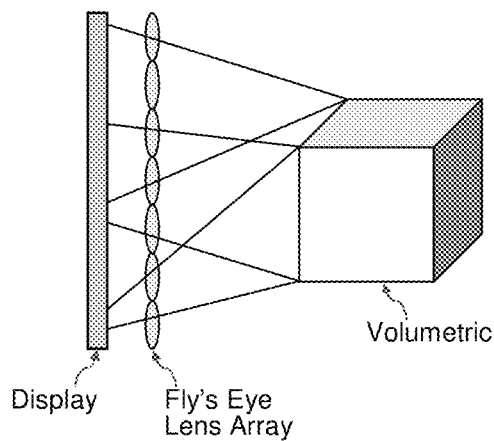
FIG. 1 shows prior art integral imaging light field display systems.
Figure 2:
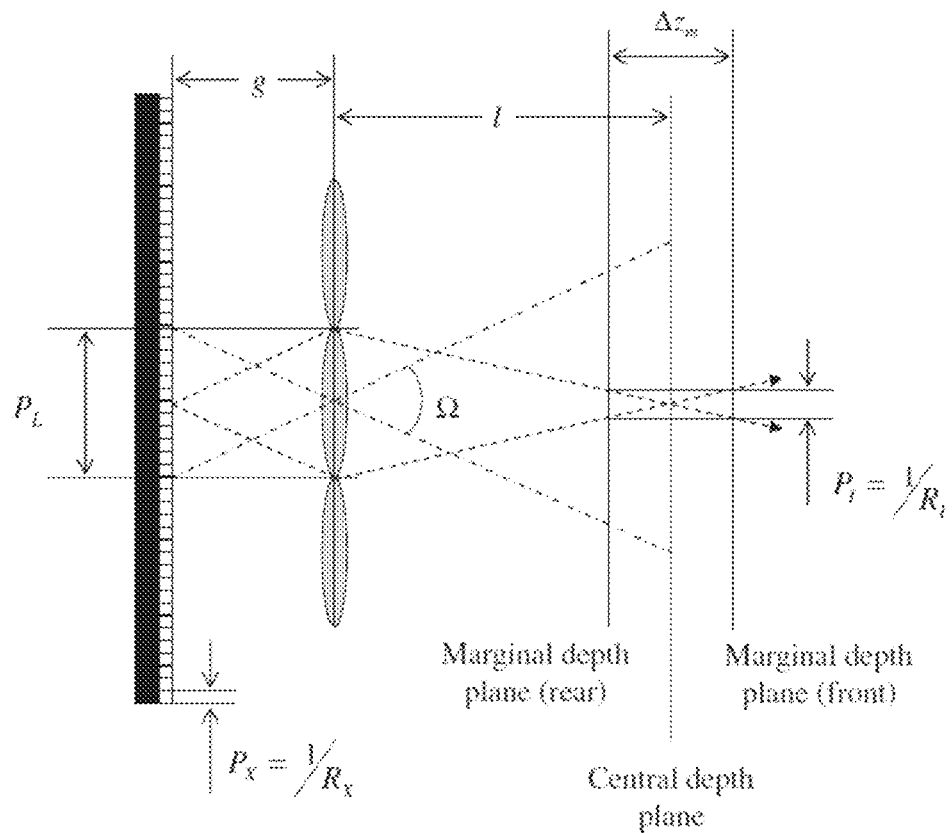
FIG. 2 shows prior art integral imaging system and its characteristic parameters.
Figure 3:
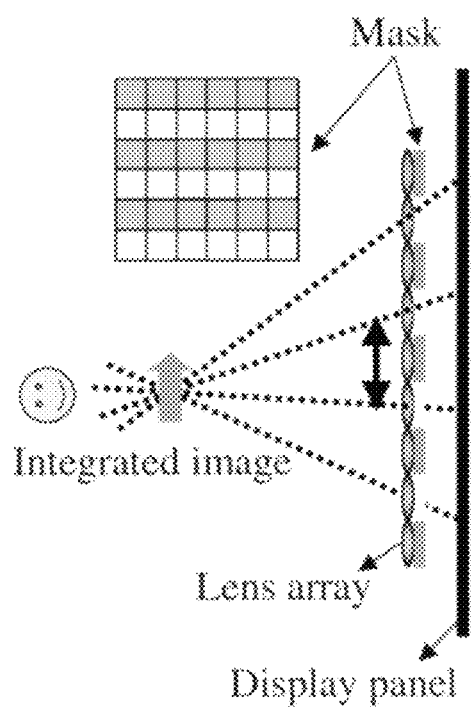
FIG. 3 illustrates prior art mask based integral imaging display viewing angle improvement method.
Figure 4:
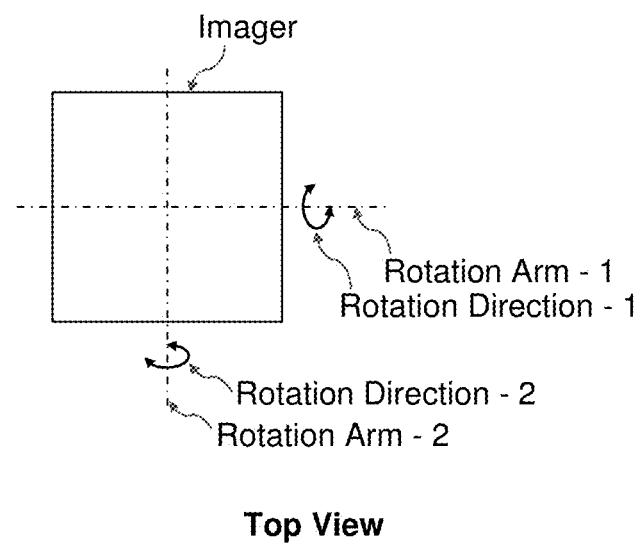
FIG. 4 illustrates the main embodiment of this invention in top view and side view.
Figure 4:
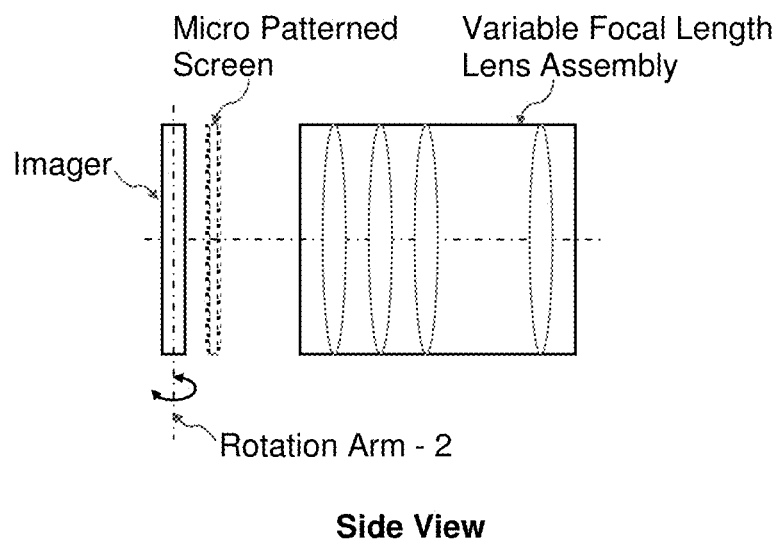

FIG. 4 shows one embodiment of a novel 3D display system that makes use of an emissive imager with high speed modulation capabilities, preferably a solid state imager in this and other embodiments, high brightness and high dynamic range, combined with a rotational modulation system that rotates the imager through limited angles, a micro patterned screen that adds directional modulation capabilities and a variable focal length lens assembly that adds depth modulation capabilities. The micro patterned screen in FIG. 4 would typically be comprised of multiplicity of micro-scale optical facets, such as prisms or spherical surfaces, for example, that are designed to refract the light emitted from the imager's pixels in a specific direction depending on the respective spatial position of the pixel. In FIG. 4 the imager is used to display a group of pixels in a two dimensional plane, Rotation Arm-1 and Rotation Arm-2 rotate the display in Rotation Direction-1 and Rotation Direction-2 which are directions perpendicular to each other. Micro Patterned Screen forms the interface between the Variable Focal Length Lens Assembly and the imager and aids in directionally modulating the pixels displayed by the imager. Variable focal length lens assembly adjusts its focal length to change the location of the image generated by the imager and micro patterned screen. The variable focal length lens would typically be realized using methods that either change the lens surfaces' curvature, such as magnetically induces variable curvature liquid lenses, or change the lens index of refraction, such as electrically induced variable index liquid crystal. Either way the variable focal length lens would realized, its focal length would controlled electronically through hardware and associated embedded software algorithms.

In one embodiment of the present invention, the imager provides two dimensional (2D) modulation of the pixels spatially in the imager plane, the micro patterned screen attached to the imager provides three dimensional (3D) modulation by modulating the imager pixels directionally with either collimated, converging or diverging light beams where the pixel location determines the direction of the modulation and the distance between the imager and the screen determines the collimation of the light beam. Thus in one embodiment of this invention the imager directly provides a 2D modulated image to the variable focal lens and in another embodiment of this invention the combination of the imager and the micro patterned screen provides a 3D modulated image to the variable focal lens. The variable focal length lens assembly modulates the two dimensional image in a direction perpendicular to the imager axis and works as a floating device (or relay) to create a real image between the lens assembly and the viewer. An important aspect of the variable focal length lens assembly of the present invention is that it is able to change its focal length at a rate that would not be perceived by the human visual system (HVS), for example at a rate of change of at least 60 Hz. As the focal length of the lens assembly changes, at least at 60 Hz rate, the two dimensional or three dimensional image that emanates from the imager and micro patterned screen is placed at a different depth location while the change in the depth at which the images are formed would not be perceived by the HVS. When the image input to the variable focal length lens assembly is a two dimensional (2D) image, the fast modulation of the lens focal length combined with a fast modulation of the 2D image on the imager creates a series of 2D images arranged back to back in a plane perpendicular to the imager plane. The micro patterned screen functions as an optical interface and as a directional light modulator that enables use of larger or smaller diameter lens assembly and also to fill the gaps between the image slices by giving them a small volume. The combination of the imager, micro patterned screen and the lens assembly is enough to create a volumetric image formed with slices of shallow depth three dimensional images. However, because of the limited directional modulation capabilities of a micro patterned screen, this volumetric 3D image will have a very limited amount of viewing angle and will not be able to display enough perspectives to create a floating image sensation. When the image input to the variable focal length lens assembly is three dimensional (3D) the variable focal length lens assembly can be programmed to arrange multiple volumetric images back to back in an edge matched, overlapped or non-matching configuration to create larger volumetric images. In both 2D and 3D input modes to the variable focal lens assembly the modulated images can be intentionally separated in space to achieve data compression or power savings, without affecting the perceived image quality since the human visual system can blend multiple images presented at about 0.6 diopter distance away from each other.

The rotation arms help with the additional directional modulation of the volumetric image created by the imager, screen and lens assembly combination. The directional modulation that is achieved by the rotation arms can be thought of as a lens with no aberrations and a very large aperture. The fast volumetric modulation capabilities combined with the two axis rotation enable creation of different perspective views and a more realistic 3D image sensation that can be viewed by multiple viewers without requiring glasses or causing discomfort.

In another embodiment of this invention the micro patterned screen can be moved in small increments in the axes parallel to the imager to increase the number of modulated directional beams. The imager and micro patterned screen combination can be moved by the same rotational arms to reduce system volume and simplify image processing or the micro patterned screen can be placed in a stationary configuration to reduce system power consumption.

In another embodiment of this invention the variable focal length lens assembly can be moved with the imager and micro patterned screen by the rotational arms to minimize the total volume of the system and simplify the image processing algorithms. Or the focal length assembly can be stationary, to reduce system power consumption.

Image Formation and Rendering Considerations

Figure 5:
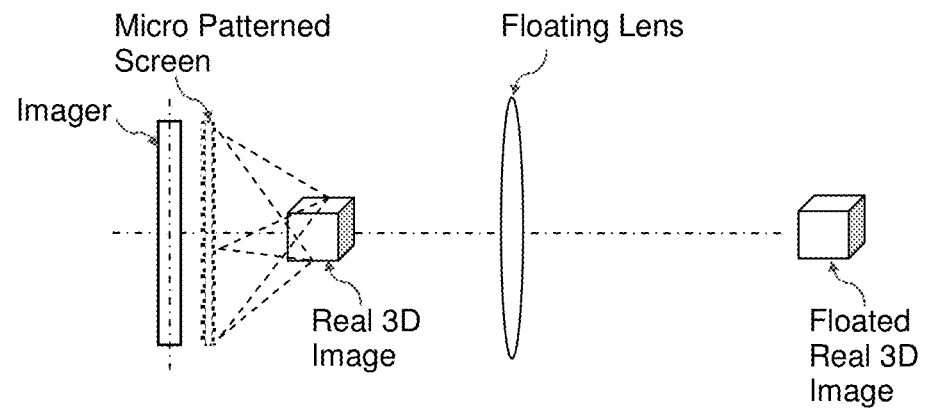
FIG. 5 illustrates real 3D and virtual 3D images and using the variable focal length lens assembly to float (or transfer) these real 3D and virtual 3D images to different locations.
Figure 5:
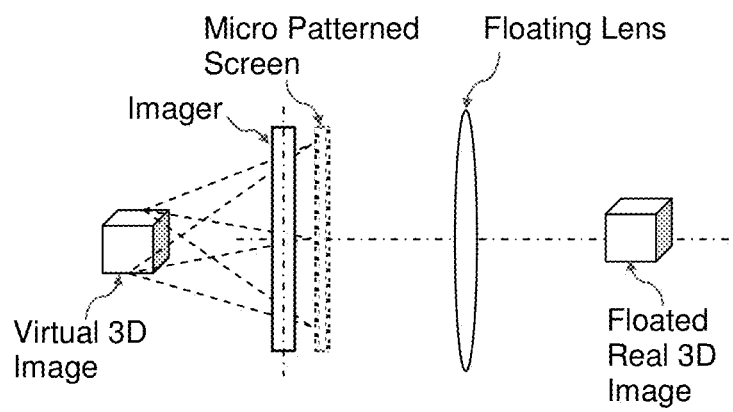

The light field display system of this invention can be used to create large viewing angle, large depth and high resolution real 3D images or virtual 3D images by changing the elemental image creation and multiplexing methods. FIG. 5 shows the details of the real and virtual 3D images transferred by the adjustable focal length lens assembly to a different location away from near the display surface. In the real 3D image mode, the imager and the micro patterned screen create an image that is between the micro patterned screen and the adjustable focal length lens assembly. In the virtual 3D image mode, the imager and the micro patterned screen create an image that is between the micro patterned screen and the imager. It is also obvious to the skilled in the art that a third imaging mode called a focused 3D imaging mode can create images that can exist simultaneously both in real 3D and virtual 3D image locations. The location of the real 3D, the virtual 3D or focused 3D images can be adjusted by well known rendering algorithms. By adjusting the location of these 3D images in rendering software and adjusting the focal length of the variable focal length lens assembly, depth volume, final image location and image resolution can be controlled. Image resolution is usually higher in the real 3D and virtual 3D modes and lower in the focused 3D mode, while the depth created around the imager is the largest in the focused 3D mode.

Figure 6:
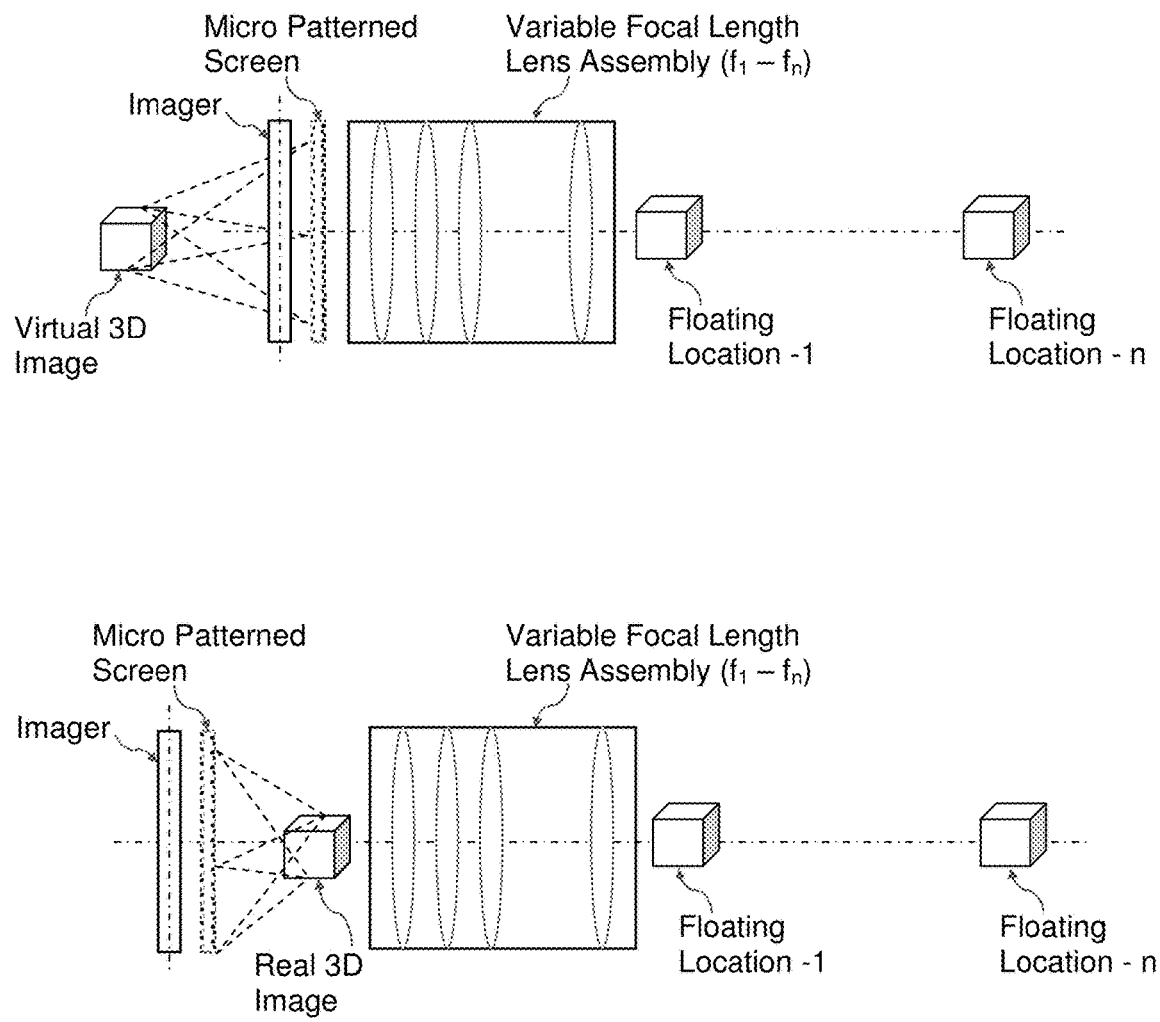
FIG. 6 illustrates the variable focal length lens assembly's capability to move images to multiple locations by varying its focal length.

FIG. 6 illustrates the operation of the display in real 3D and virtual 3D modes, in both modes the 3D images generated by the imager and micro patterned screen combination is moved by the variable focal length lens assembly to different image locations. When the focal length of the lens assembly is f1, the 3D image is transferred to floating location-1, when the focal length is fn the image is transferred to floating location-n. By fast modulation of the focal length of the variable focal length lens assembly the 3D images generated by the imager and the micro patterned screen can be displayed within a frame time of the display and appear as a continuous 3D image.

Figure 7:
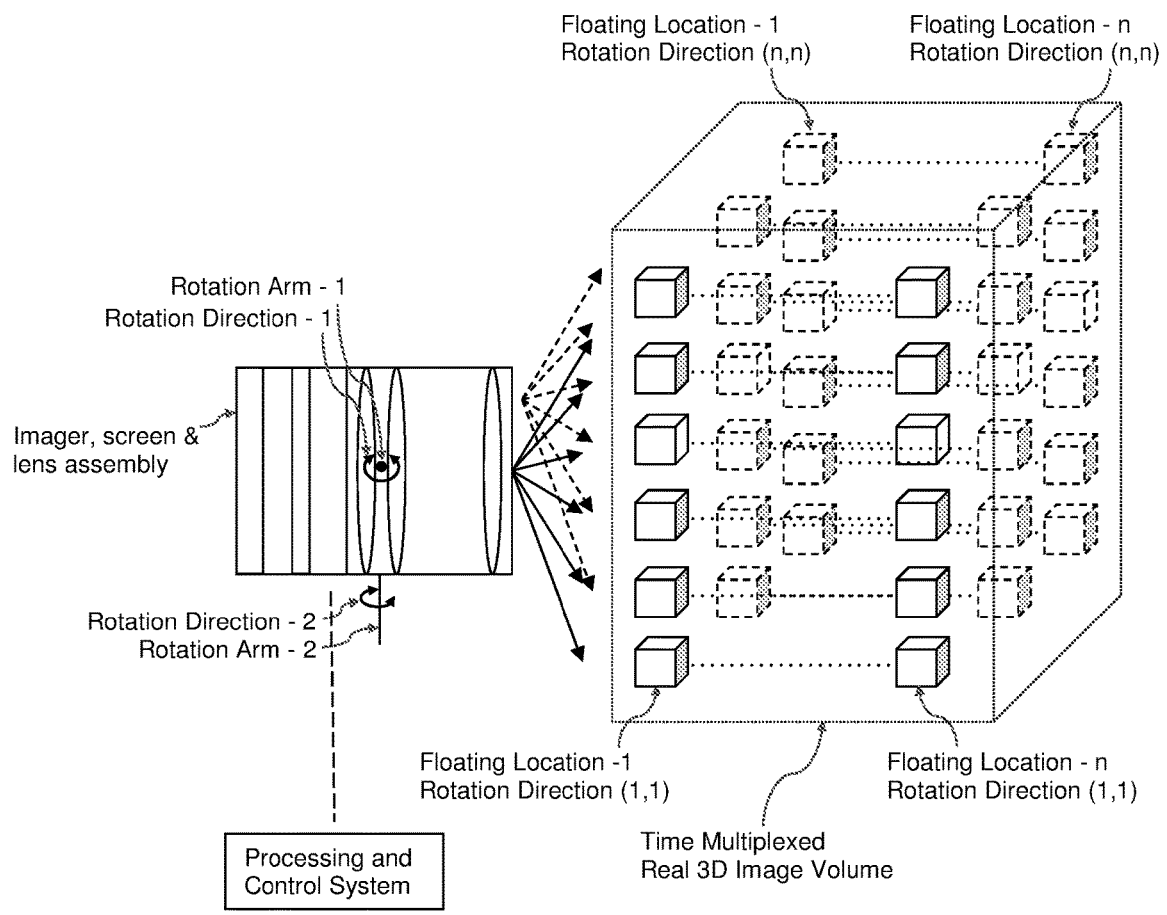
FIG. 7 illustrates the overall system in operation, rotational modulation system, variable focal length lens assembly, micro patterned screen and the imager working together with the rendering software to create a large 3D volume by placing images in different locations in space.

FIG. 7 shows that it is possible to create a larger image volume as well as a wider viewing angle using the light field display system of this invention, when the imager, micro patterned screen and the variable focal length floating lens are rotated in two axes. At each rotation direction, rotation direction (1,1) through rotation direction (n,n), the rendering system renders and displays the group of images at different locations, floating-location-1 through floating location-n for that specific direction. When all the images belonging to a specific rotation direction are displayed the rotation arms move to a different direction, until all the images belonging to all the directions are displayed in one frame.

Figure 8:
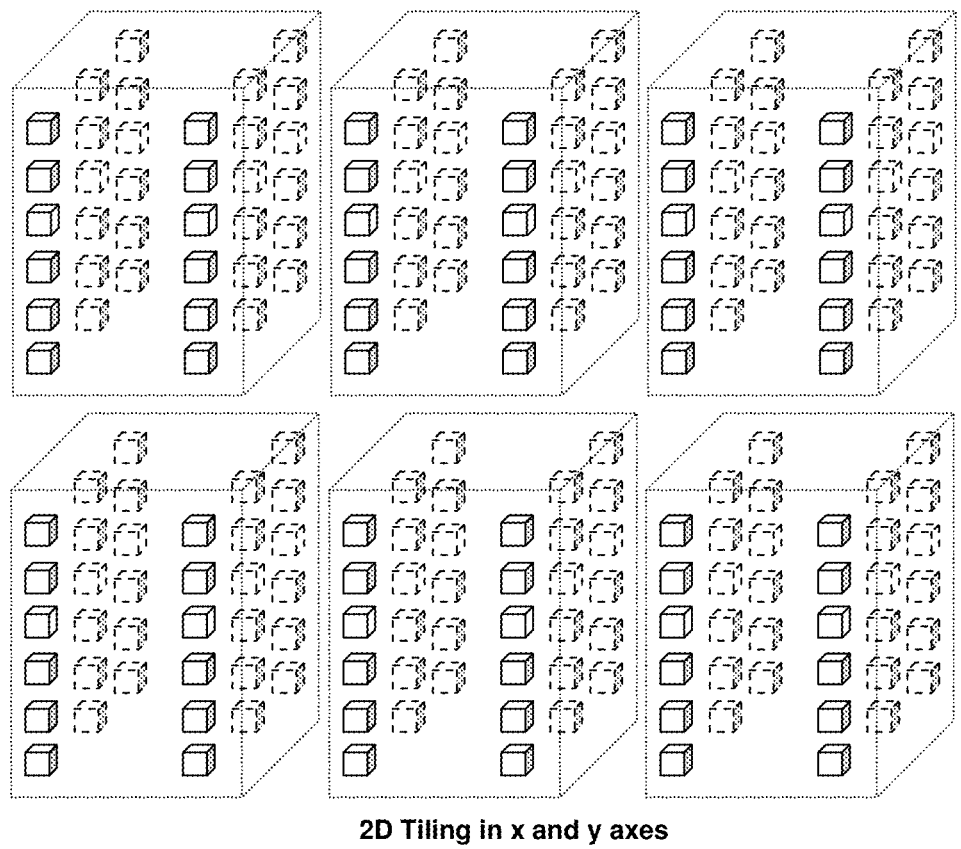
FIG. 8 illustrates 2D and 3D tiling of the 3D images generated by the invention to create even larger volume 3D images.
Figure 8:
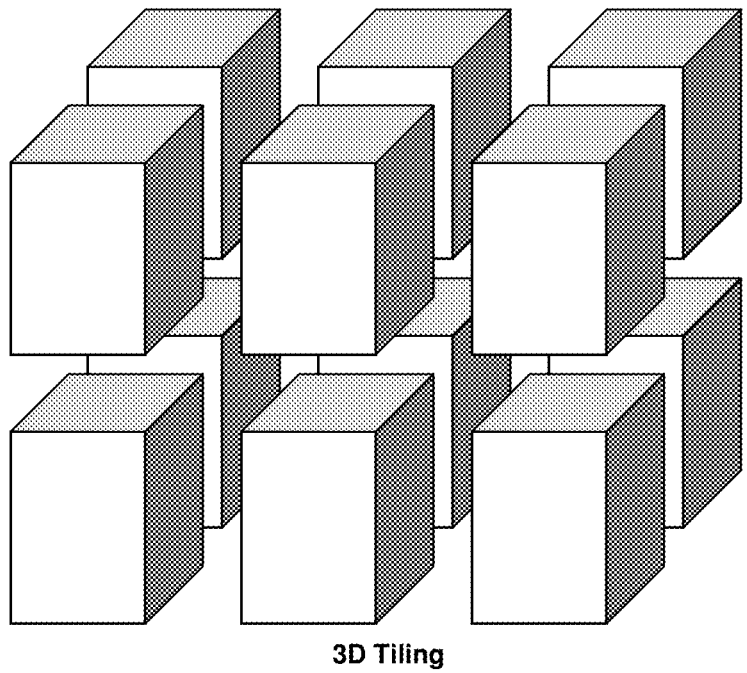

FIG. 8 shows 2D and 3D tiling of the volumetric images generated by the imaging system shown in FIG. 6. When 2D tiling is used the volumetric images are tiled in the x and y directions to create an even wider 3D image volume. When the 2D tiling is done in only the x and y directions the image size would proportionally increase the x and y direction. However, depending on the size of the tiles and the image rendering method in some cases image size in the z direction, or the depth, can be increased as well. When 3D tiling is used the image volume can be expanded in the x, y and z directions simultaneously. 3D image tiling can be done by transferring and arranging the volumetric images in the x, y and z directions. To accomplish this objective the images generated by tiled displays in only two axes including but not limited to x-y, x-z or y-z axes are transferred by optical means to align in a common image volume area in x, y and z axes.

It is an established fact in the vision science that when two or more images are presented to the visual system with 0.6 diopters distance between the adjacent images the human visual system would fill in the empty volume between the adjacent images by depth blending the images. The rendering of the images for this purpose would be done considering the depth of the images in diopters and explained in prior art extensively. Another embodiment of the present invention renders and displays images that are 0.6 diopters apart from each other to enable depth blending by the human visual system. Creating and displaying images with 0.6 diopter separation can reduce the total number of images that need to be created and displayed to achieve substantially large image volume. Even though 0.6 diopters is enough of a separation to create depth blending in the human visual system, this distance can be adjusted to achieve higher contrast images or different effects.

In another embodiment of this invention the 3D imaging data presented to the display system can be rendered with methods of compressed rendering and display matched compression.

Those skilled in the art will readily appreciate that various modifications and changes can be applied to the embodiments of the invention without departing from its scope defined in and by the appended claims. It should be appreciated that the foregoing examples of the invention are illustrative only, and that the invention can be embodied in other specific forms without departing from the spirit or essential characteristics thereof. The disclosed embodiments, therefore, should not be considered to be restrictive in any sense. The scope of the invention is indicated by the appended claims, rather than the preceding description, and all variations which fall within the meaning and range of equivalents thereof are intended to be embraced therein.

What is claimed is:

1. A light field display system, comprising:
an emissive imager comprising a multiplicity of emissive multi-color pixels,
a micro patterned screen for directionally modulating light emitted from the emissive multi-color pixels of the emissive imager, the emissive imager and the micro patterned screen together forming a 3D image,
a variable focal length lens assembly disposed to receive light emission from the emissive imager that passes through the micro patterned screen as the 3D image and transfer that 3D image to a location responsive to the focal length of the variable focal length lens assembly,
a rotational modulation system for rotating the emissive imager, the micro patterned screen, and the variable focal length lens as an assembly in a first rotational direction, and
an image processing and control system coupled to execute image rendering algorithms and control the emissive imager, the variable focal length lens assembly and the rotation modulation system,
whereby the light field display system is capable of creating wide viewing angle, high resolution, large depth light field images.

2. The light field display system of claim 1 wherein the emissive imager comprises a solid state emissive imager.

3. The light field display system of claim 1, wherein the micro patterned screen is disposed adjacent an emitting surface of the emissive imager to directionally modulate the light emitted from the emissive multi-color pixels of the emissive imager before the light is coupled into the variable focal length lens assembly.

4. The light field display system of claim 3 wherein the micro patterned screen forms an interface between emissive imager and the variable focal length lens assembly in which the micro patterned screen directionally modulates the light emitted from the multiplicity of emissive multi-color pixels in a specific direction depending on the respective spatial position of the respective pixel.

5. The light field display system of claim 4 wherein the directional modulation of the micro patterned screen is realized using a multiplicity of micro-scale optical facets that are designed to refract the light emitted from the multiplicity of emissive multi-color pixels in a specific direction depending on the respective spatial position of the pixel.

6. The light field display system of claim 1 or claim 3 wherein the variable focal length lens assembly is controlled electronically through hardware and associated embedded software algorithms.

7. The light field display system of claim 6 wherein the variable focal length lens assembly provides a depth modulation capability by changing at least one lens surface curvature or by changing at least one lens index of refraction.

8. The light field display system of claim 1 or claim 3 wherein the rotational modulation system is configured to controllably rotate the emissive imager in two axes that are perpendicular to each other.

9. The light field display system of claim 8 wherein the rotational modulation system is configured to provide directional modulation of the light field images created by the emissive imager, the micro patterned screen and the variable focal length lens assembly.

10. The light field display system of claim 8 wherein rotational modulation system is configured to act as a lens with no aberrations, a very large aperture and wide field of view.

11. The light field display system of claim 3 wherein the micro patterned screen is further configured to create collimated, converging or diverging light beams using the light emitted from the emissive multi-color pixels.

12. The light field display system of claim 1 or claim 3 further adapted to create both 2D images and 3D images.

13. The light field display system of claim 1 or claim 3 wherein the variable focal length lens assembly is configured to change its focal length at a rate that would not be perceived by the human visual system to place modulated images at different depth locations at a rate not perceived by the human visual system.

14. The light field display system of claim 10 wherein the variable focal length lens assembly is configured to change its focal length at a rate of at least 60 Hz.

15. The light field display system of claim 1 or claim 3 wherein the variable focal length lens assembly is further configured to modulate 2D or 3D images generated by the emissive imager and the micro patterned screen in a direction perpendicular to a plane of the emissive imager.

16. The light field display system of claim 1 or claim 3 wherein the variable focal length lens assembly is programmed to arrange 2D and 3D images back to back, in overlapped, edge matched and non-matched configurations.

17. The light field display system of claim 1 or claim 3 further comprising a light field rendering adapted to feed the light field display system with image data to create 2D and 3D images.

18. The light field display system of claim 17 further configured to control the variable focal length lens assembly.

19. The light field display system of claim 17 further comprising separating the modulated images by 0.6 diopters to utilize human visual system's depth blending ability.

20. The light field display system of claim 17 further comprising a light field rendering adapted to feed the light field display system with image data to create 2D and 3D images, and wherein real 3D, virtual 3D and focused 3D images are created by rendering input images to the emissive imager and by controlling the distance of micro patterned screen from the emissive imager.

21. The light field display system of claim 17 configured for compressed rendering and display matched compression to compress the image data.

22. The light field display system of claim 3 wherein the micro patterned screen is configured to move in small increments parallel to the emitting surface of the emissive imager to increase the number of modulated light beams.

23. The light field display system of claim 1 or claim 3 wherein the rotational modulation system is further configured either to move the emissive imager alone, move the emissive imager and micro patterned screen together, or move imager micro patterned screen and variable focal length lens assembly together, and wherein the rotational modulation system is further configured to move imager alone, to move imager and micro patterned screen together, or to move imager micro patterned screen and variable focal length lens assembly together.

24. The light field display system of claim 23 wherein the rotational modulation system is configured to controllably rotate the emissive imager in two axes that are perpendicular to each other.

25. The light field display system of claim 1 or claim 3 wherein the light field display system is configured to receive as image data, real 3D, virtual 3D and focused 3D image data.

26. The light field display system of claim 1 or claim 3 wherein the variable focal length lens assembly is controlled to present images at different locations in space within a frame time.

27. The light field display system of claim 1 or claim 3 wherein the rotational system is controlled to create a bigger 3D image volume.

28. The light field display system of claim 1 or claim 3 wherein multiple light field display systems are tiled to create a larger 3D volume and a larger 2D display.

29. The light field display system of claim 1 or claim 3 configured to create images that enable depth blending by a human visual system.

30. The light field display system of claim 1 or claim 3 configured to separate depth blendable images by predetermined distances.

31. The light field display system of claim 1 or claim 3, wherein the rotational modulation system is configured to rotate the emissive imager, the micro patterned screen, and the variable focal length lens as the assembly in a second rotational direction, wherein the second rotational direction is substantially perpendicular to the first rotational direction.

* * * * *